United States Patent Office.

HENRY WURTZ, OF NEW YORK, N. Y., ASSIGNOR TO JAMES LORIMER GRAHAM, OF SAME PLACE.

Letters Patent No. 99,738, dated February 8, 1870.

IMPROVED ARTIFICIAL FUEL.

The Schedule referred to in these Letters Patent and making part of the same.

*To all whom it may concern:*

Be it known that I, HENRY WURTZ, of New York, in the county of New York, in the State of New York, have invented a new and improved Mode of Making Compositions from Waste and Comminuted Combustibles, suitable for fuel for heating stills, for steam and other purposes, and for kindling for anthracite and other fuels; and I do hereby declare that the following is a full and exact description thereof.

Description.

The nature of my invention consists in using as an ingredient in the composition and conglomeration or concretion of waste or comminuted combustibles, the resinoid mineral from Ritchie county, West Virginia, which I call Grahamhite, the almost total absence from grahamite of sulphur, silica, and other injurious mineral contaminations, adapting it preëminently for these purposes.

Raw Grahamite, however, being difficult of fusion and somewhat frangible, I have generally found advisable, before using it as a cement for comminuted combustibles, to convert it first into compositions of a more fusible and coherent character, by combining it with some material of a tarry, resinous, balsamic, pitchy, or asphaltic nature, as specified in the patent issued to me August 13, 1867, No. 67,696, for "the manufacture of cements, &c., from Grahamite."

The cement compositions generally preferred by me for this purpose, are those made with coal-tar, and coal-tar pitch.

Another cement composition for the same purpose, preferable in some cases on account of its more agreeable odor, though somewhat more expensive, is that described in the above patent as made by fusing grahamite with raw or crude turpentine.

The most available materials for conglomeration into artificial fuel-blocks, by means of Grahamite cement, may be specified as follows:

Anthracite dust or culm, charcoal and coke powder, peat and peat charcoal, dust or culm of bituminous and semi-bituminous coals, chips, shavings, and sawdust of wood, dry, ground, or chopped or comminuted vegetable-matter of any kind, brush, twigs, straw, weeds, rushes, &c.

In the case of the dust or culm of mineral coals, particularly of anthracite, it is advisable first to submit the material to some process of purification, to separate slate, sulphur, clay, &c., from it, in ordinary cases, by washing in a sluice or other suitable apparatus, as very commonly practiced in European countries.

The modes patented in England, July 31, 1855, No. 1,734, by Herbert Mackworth, and at other periods by other patentees, (by means of solutions of chloride of calcium, &c., of such density as to float the purer part of the culm, and allow the impurities to sink,) are also recommended in certain cases.

After the incorporation of the comminuted combustible with the Grahamite cement, effected by any of the well-known machinery in extensive use, particularly in France and Belgium, for such purposes, I prefer to heat the mass thoroughly and uniformly before pressing into bricks or other shapes, by what is known as the method of Gruner; that is, by permeating the mass with superheated steam.

The incorporated and heated composition is then passed, by any suitable machinery, into the moulds, and pressed by a heavy pressure into bricks, or any desired form.

When these compositions are to be used for kindling for other fuel, I prefer so to mould the bricks, that they will contain numerous perforations, in a manner described more fully in a specification to be filed at a future period.

Claim.

What I claim as my invention, and desire to secure by Letters Patent, is—

The use, as a material for the purpose of concreting or conglomerating combustible substances by heat, either with or without pressure, of Grahamite, either alone or in combination.

In testimony whereof, I have hereunto attached my signature in the presence of two witnesses, in the city of New York, this 28th day of September, 1867.

HENRY WURTZ.

Witnesses:
CHARLES A. SEELY,
MICHAEL J. HAVILAND.